Oct. 18, 1966       J. BOWE       3,279,394
RECEPTACLE AND CONE SUPPORT FOR COTTON CANDY
Filed July 7, 1964                    2 Sheets-Sheet 1

INVENTOR.
JOHN BOWE
BY
Morse, Altman & Oates
ATTORNEY

Oct. 18, 1966  J. BOWE  3,279,394
RECEPTACLE AND CONE SUPPORT FOR COTTON CANDY
Filed July 7, 1964  2 Sheets-Sheet 2

INVENTOR.
JOHN BOWE
BY
Morse, Altman & Oates
ATTORNEYS 3,279,394
RECEPTACLE AND CONE SUPPORT FOR COTTON CANDY
John Bowe, 29 Maple St., Salisbury, Mass.
Filed July 7, 1964, Ser. No. 380,791
2 Claims. (Cl. 107—8)

This invention relates to an improvement in cotton candy machine receptacles. As hereinafter described, the improved receptacle is for use as a part of a duplex machine having two simultaneously operated spinner heads for the production of fine filaments of sugar, masses of which are collected on paper cones for sale as cotton candy. When a single operator is running a concession, it sometimes requires considerable agility to tend the machine, gather masses of sugar filaments on paper cones, serve customers, and make change in the process of receiving payment. It is an object of the present invention to facilitate the operation of the machine so that an operator can serve customers more expeditiously when business is brisk. For a more complete understanding of the invention, reference may be had to the following description thereof, and to the drawing, of which FIGURE 1 is a perspective view of a container embodying the invention;

Figure 1:
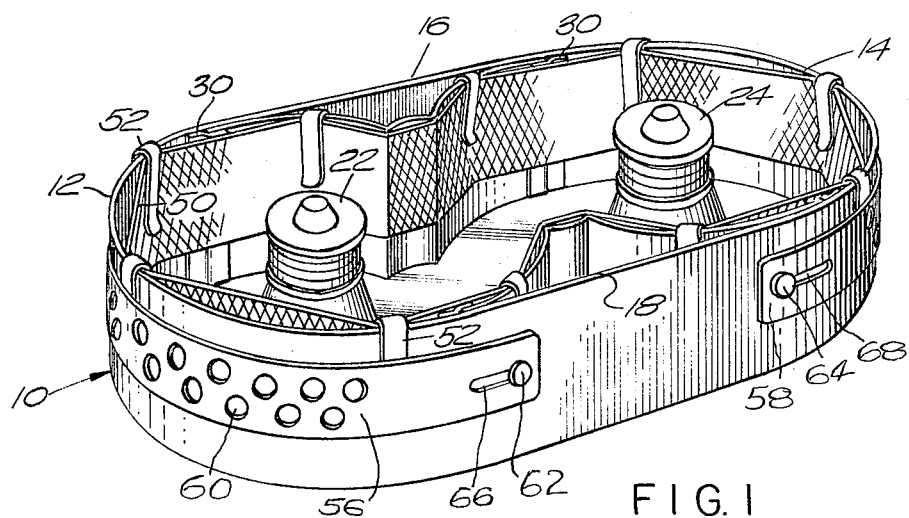

The container illustrated on the drawing comprises a vertical wall 10 of generally oval shape, having semicircular end portions 12, 14 which are outwardly bowed and are connected by straight portions 16, 18, and a bottom member 20 through which the shafts for spinner heads 22, 24 project up from below.

Figure 2:
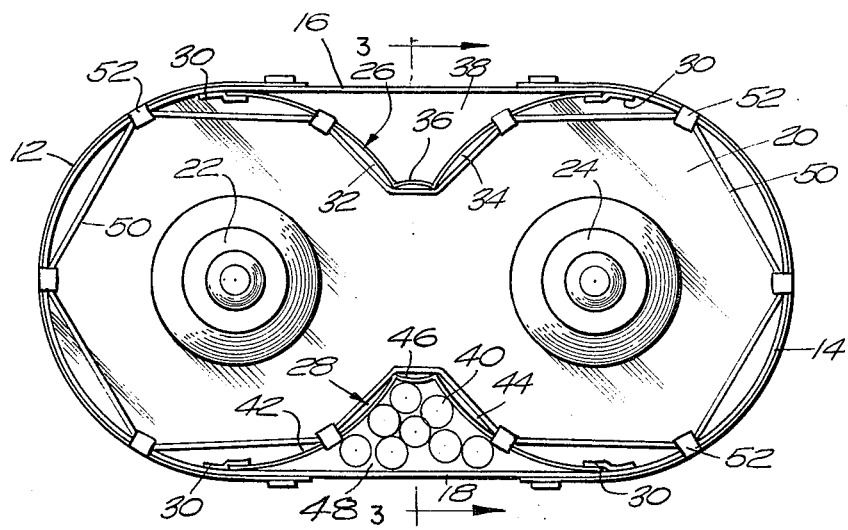
FIGURE 2 is a plan view of the same.

Removably mounted within the container are two false wall members 26, 28, the end edges of these members being slipped in behind strips 30 which are secured within the wall 10 at the junctions of the semicircular portions and the straight portions, these strips being offset from the surface of the wall 10 sufficiently to admit the ends of the false wall members 26, 28, as indicated in FIGURE 2.

The false wall member 26 has two curved portions 32, 34 which continue the curvature of the semicircular wall portions 12, 14 respectively and are connected by a short, outwardly bowed portion 36. The false wall 26 and the straight wall portion 16 define a convenient storage space 38. The false wall member 28 is similarly shaped and located with reference to the straight wall portion 18, this member having curved portions 42, 44 which continue the curvature of the semicircular wall portions 12, 14 and are connected by an outwardly bowed portion 46, thus defining a storage space 48 similar to the space 38. These storage spaces can be used to advantage to hold numbers of paper cones 40 where they can be quickly and easily reached.

A liner 50 of coarse mesh netting of a synthetic resin is removably mounted within the container by a series of clips 52 which are located at spaced points along the semicircular end walls 12, 14, the netting being pulled taut so as to form chords within the arcs between successive clips 52, and within the arcs of the false wall portions 32, 34, 36, 42, 44, 46. The liner 50 extends down from near the top edge of the container to a level below the spinner heads from which the fine filaments of molten sugar are flung horizontally when the machine is in operation.

Figure 3:
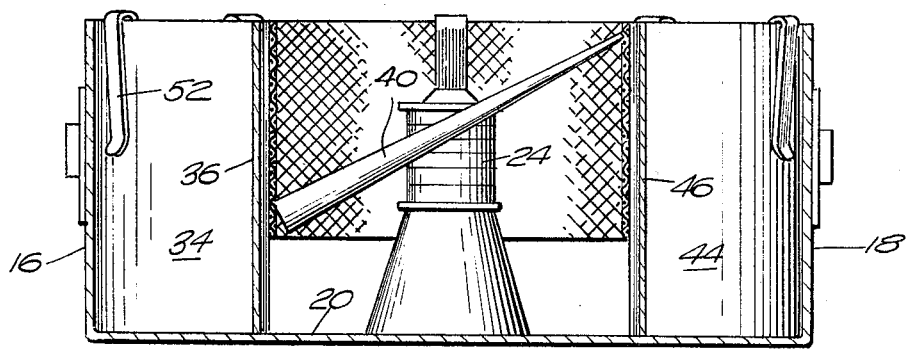
FIGURE 3 is a section on the line 3—3 of FIGURE 2, on a larger scale.
Figure 4:
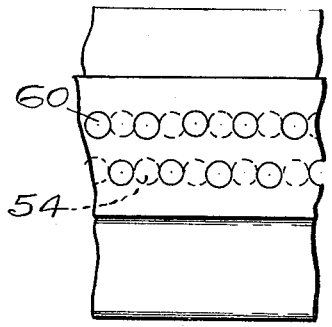
FIGURE 4 is a fragmentary end elevation of the container shown in FIGURE 3.
Figure 5:
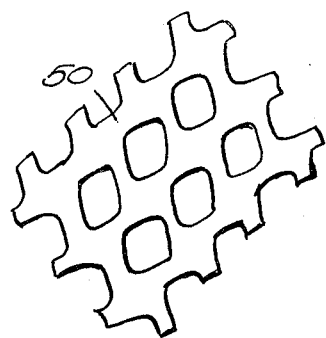
FIGURE 5 is an enlarged fragmentary view of netting used in the container.

To collect and handle a mass of "cotton candy" a paper cone 40 twelve inches in length is customarily employed. To accommodate such cones, the inserts 26, 28 are designed so that the short bowed portions 36, 46 thereof are spaced apart about eleven inches. A cone 40 can quickly be taken from the space 38 or 48 and mounted in a sloping position between these short wall portions, as shown in FIGURE 3, and can as quickly and easily be removed therefrom. While in its mounted position the cone receives some of the filaments from both of the spinner heads, which filaments may be of the same color or contrasting colors. When the machine is operating, a fluffy ring of sugar fibers builds up against the wall around each head, these rings attaching themselves to the cone 40 and adhering lightly also to the netting 50 which lines the container. When a sufficient quantity of sugar filaments has accumulated, the cone 40 is lifted by the small end from its position between the wall portions 36, 46. The two rings of filaments are raised by it above the container. The cone is at once manually waved with a circular movement to collect the two rings of filaments into a coherent mass on the paper cone. This is then ready for delivery to the consumer. With a little practice, this can be done very quickly. Speed of manipulation is necessary when two spinner heads are working simultaneously since the time required to produce a serving of cotton candy is half that required for a single spinner head.

To promote the radially outward drafts of air from the spinner heads which carry the sugar filaments to the netting 50, a series of holes 54 are provided through the semi-cylindrical wall portions 12, 14 on a level with the spinner heads 22, 24. These holes may be partly or wholly closed, as desired, by means of dampers consisting of flexible metal or plastic ribbons 56, 58 which extend around the ends of the container and have holes 60 which can register with the holes 54. The ribbons are held in place by studs 62, 64 which are secured in the wall of the container and extend through slots 66, 68, respectively in the end portions of the ribbons. The ribbons can be shifted longitudinally to regulate the degree of registration of the holes 60 with the holes 54.

I claim:

1. A receptacle for a duplex cotton candy machine having two spinner heads rotatably mounted therein, said receptacle comprising a bottom and a vertical wall rising from said bottom, said wall having semi-cylindrical end portions, coaxial with respective spinner heads and straight portions connecting said end portions, a false wall member removably mounted within and adjacent to each said straight portion of the wall, each said false wall member having two portions continuing the curvature of the semi-cylindrical end portions of the wall and connected by a short outwardly bowed portion, and a liner of coarse mesh netting removably secured within the container at the level of the spinner heads, said liner touching said wall and false wall members at spaced points only, whereby air spaces are provided between the stretches of liner and the adjacent portions of the wall and false wall members.

2. A receptacle as described in claim 1, said semicircular portions of the wall each having a series of holes therethrough between the levels of the top and bottom of said liner, and means on said wall movable to close said holes.

References Cited by the Examiner
UNITED STATES PATENTS
3,160,119   12/1964   Bowe et al. _____ 107—8

IRVING BUNEVICH, *Primary Examiner.*